J. H. VALLEAU.

HITCHING STRAP.

No. 11,457. Reissued Dec. 11, 1894.

Witnesses:
Chas. E. Brock
Clara B. Milligan

Inventor:
James H. Valleau
By R. H. P. Lacey
Attorney

THE NORRIS PETERS CO., PHOTO-LITHO., WASHINGTON, D. C.

UNITED STATES PATENT OFFICE.

JAMES H. VALLEAU, OF SIOUX CITY, IOWA, ASSIGNOR OF ONE-HALF TO T. N. BRAY, OF SAME PLACE.

HITCHING-STRAP.

SPECIFICATION forming part of Reissued Letters Patent No. 11,457, dated December 11, 1894.

Original No. 525,568, dated September 4, 1894. Application for reissue filed November 14, 1894. Serial No. 528,841.

*To all whom it may concern:*

Be it known that I, JAMES H. VALLEAU, a citizen of the United States, residing at Sioux City, in the county of Woodbury and State of Iowa, have invented certain new and useful Improvements in Hitching-Straps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention is an improved hitching strap the object of the device being to hold the strap securely around a hitching post and prevent it dropping or rising thereon.

Hitching straps as usually constructed have to be wrapped several times around a post, and then the strap frequently becomes slack, and either drops down or is lifted off by the horse.

My invention prevents this by keeping the end of the strap to which the horse is attached, perfectly tight. This I accomplish by means of my improved attachment which can be readily attached to any of the hitching straps now in use without altering or injuring the same, and this attachment consists simply of a ring or loop through which the strap is passed, a flat spiral spring connected with said loop, and carrying at its opposite end a fastening device for binding it to the strap.

My invention consists also in certain details of construction and combination of parts all of which will be fully described hereinafter and pointed out in the claims.

Figure 1:
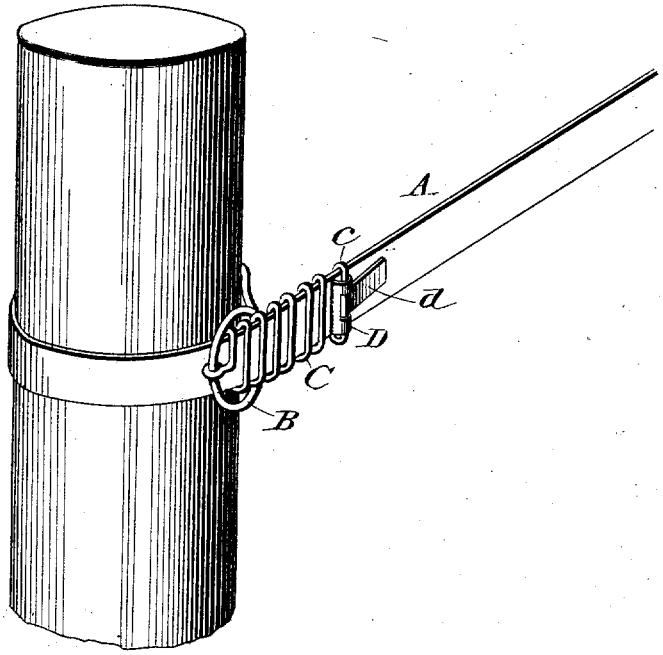
Figure 2:
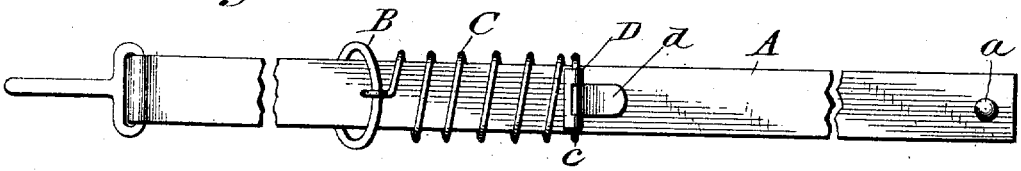
Figure 3:
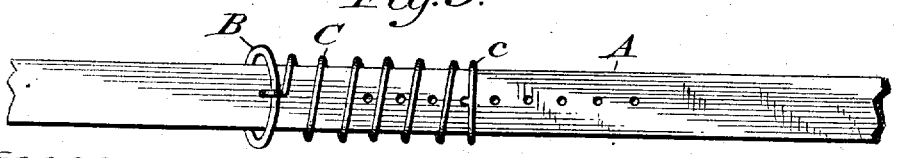

In the drawings forming a part of this specification, Figure 1, is a perspective view of my improved strap as applied to a post. Fig. 2, is a view showing the device attached to a strap but not connected with a post. Fig. 3 shows a slight modification.

In practice I employ an ordinary hitching strap A, which is provided with the usual snaps or buckles at each end. A ring or loop B, is arranged to slide upon said strap, and connected to said ring or loop is the flat spiral spring C, which is wound about the strap as shown and formed at its end with a frame or loop *c*. Pivoted to this frame or loop *c*, is a binding cam or tongue D, having a handle *d*, by means of which it is manipulated. The snaps or buckles at each end of the strap prevent the attachment slipping off, and in case the strap is not so constructed I attach a button or stop *a*, to limit the movement of the parts upon the strap. Now in operation, one end of the strap is attached to the animal to be tied, and the other end passed around the hitching post and snapped or tied into the ring or loop B. The strap is then drawn taut, the spiral spring compressed, and the cam or tongue turned down to bind or bite into the face of the strap. The tendency of the spring is to expand, and this tendency keeps the portion of the strap between the cam and end tight, so that it cannot become loose upon the post.

In Fig. 3 I have shown a somewhat modified form of fastener, in which the spring instead of being provided with a cam or tongue is formed with a pointed tongue which is adapted to engage one of a series of holes produced in the strap the same as in an ordinary buckle strap.

Having thus described my invention, what I claim, and desire to secure by Letters Patent, is—

1. The combination, with a hitching strap, of a ring or loop arranged thereon, a spiral spring connected at one end with the said ring encircling the strap, and having a frame or loop at the opposite end, and a locking cam connected with said frame, or loop, substantially as shown and described.

2. An improved attachment for hitching straps comprising a ring B, the coiled spring C, having a frame *c*, formed at one end and the binding cam or tongue D, having a handle *d*, the said ring, spring and frame being adapted to receive a strap, substantially as shown and described.

In testimony whereof I affix my signature in presence of two witnesses.

JAMES H. VALLEAU.

Witnesses:
G. W. SAUER,
JOHN T. REESE.